Patented Mar. 26, 1935

1,995,902

UNITED STATES PATENT OFFICE 1,995,902

DISAZO DYESTUFFS AND THEIR PRODUCTION

Wilhelm Scheurer and Georg Niemann, Ludwigshafen-on-the-Rhine, Germany, assignors to General Aniline Works, Inc., New York, N. Y., a corporation of Delaware No Drawing. Application November 14, 1933, Serial No. 698,017. In Germany November 22, 1932

9 Claims. (Cl. 260—78)

The present invention relates to new disazo dyestuffs and a process of producing same.

We have found that valuable disazo dyestuffs are obtained by coupling one molecular proportion of tetrazotized ortho-dianisidine with two molecular proportions of a 1-phenyl-3-methyl-5-pyrazolone containing at least one alkyl group in the phenyl nucleus. Suitable coupling components of this kind are, for example, 1-(4'-methyl-phenyl)-3-methyl-5-pyrazolone and 1-(2'-4'-dimethyl-phenyl)-3-methyl-5-pyrazolone. The resulting disazo dyestuffs are suitable for coloring rubber, celluloid and products capable of being hardened obtainable by condensation of phenol and urea, or formaldehyde and urea, or formaldehyde and casein. The products are insoluble in benzene and rubber and therefore do not bleed out into uncolored material if this is worked up together with the colored material. Materials colored with the said dyestuffs are distinguished by brilliant yellow-red shades and the dyeings are entirely fast to vulcanization.

The following example will further illustrate the nature of this invention but the invention is not restricted to this example. The parts are by weight.

Example 25 parts of ortho-dianisidine are tetrazotized in the usual manner and the resulting solution of the tetrazo compound is added to an aqueous alkaline suspension of 40 parts of 1-(4'-methyl-phenyl)-3-methyl-5-pyrazolone containing an excess of sodium bicarbonate. When the coupling is completed the whole is boiled, filtered and washed free from adhering salt. The resulting brilliant yellow-red dyestuff is insoluble in rubber and in organic solvents, as for example benzene and ethyl alcohol. It is suitable for coloring rubber and the like. Materials of this kind colored with the said dyestuff possess an excellent fastness to vulcanization.

What we claim is:

1. Disazo dyestuffs corresponding to the general formula

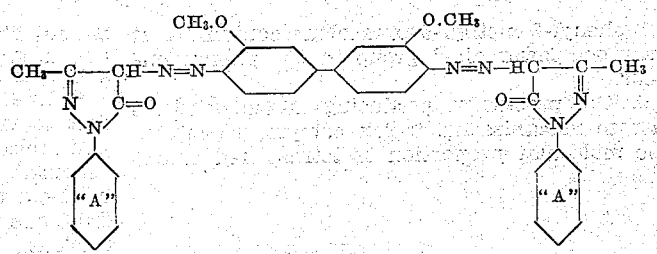

wherein to each of the nuclei marked "A" at least one lower alkyl group is attached, the said dyestuffs being fast to vulcanization.

2. Disazo dyestuffs corresponding to the general formula

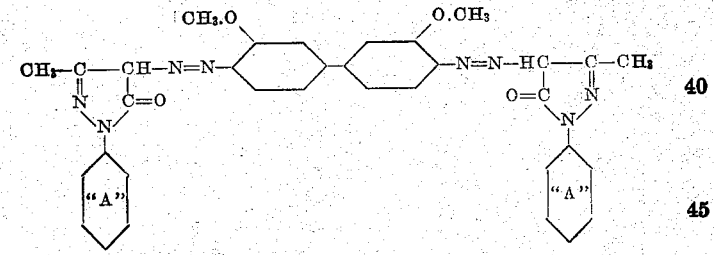

wherein to each of the nuclei marked "A" at least one methyl group is attached, the said dyestuffs being fast to vulcanization.

3. Disazo dyestuffs corresponding to the general formula

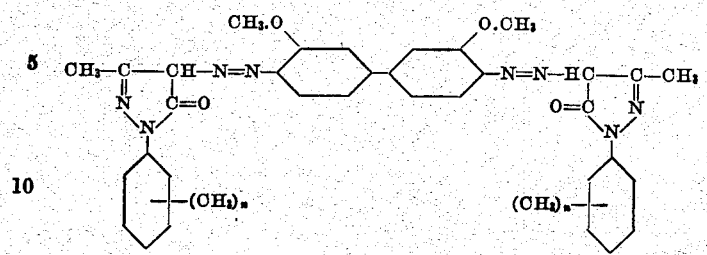

wherein *n* stands for one of the numbers 1 and 2, the said dyestuffs being fast to vulcanization.

4. The disazo dyestuff corresponding to the formula

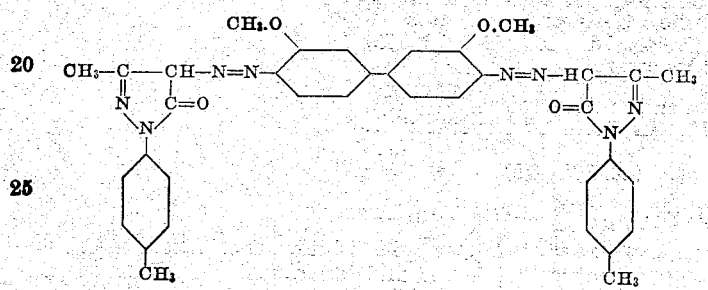

the said dyestuff being fast to vulcanization.

5. The process of producing disazo dyestuffs fast to vulcanization which comprises coupling one molecular proportion of tetrazotized ortho-dianisidine with two molecular proportions of a 1-phenyl-3-methyl-5-pyrazolone containing at least one lower alkyl group in the phenyl nucleus.

6. The process of producing disazo dyestuffs fast to vulcanization which comprises coupling one molecular proportion of tetrazotized ortho-dianisidine with two molecular proportions of a 1-phenyl-3-methyl-5-pyrazolone containing *n* methyl groups in the phenyl nucleus, wherein *n* is one of the numbers 1 and 2.

7. The process of producing disazo dyestuffs fast to vulcanization which comprises coupling one molecular proportion of tetrazotized ortho-dianisidine with two molecular proportions of 1-(4'-methylphenyl)-3-methyl-5-pyrazolone.

8. Disazo dyestuffs corresponding to the general formula

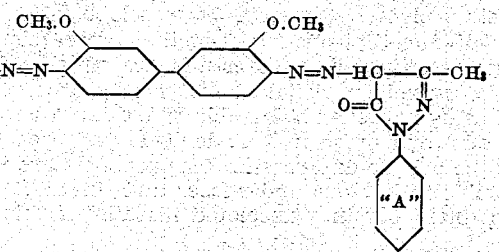

wherein to each of the nuclei marked "A" from one to two lower alkyl groups are attached, the said dyestuffs being fast to vulcanization.

9. The process of producing disazo dyestuffs fast to vulcanization which comprises coupling one molecular proportion of tetrazotized ortho-dianisidine with two molecular proportions of a 1-phenyl-3-methyl-5-pyrazolone containing from one to two lower alkyl groups in the phenyl nucleus.

WILHELM SCHEURER.
GEORG NIEMANN.